US011106221B1

(12) United States Patent
Thrun et al.

(10) Patent No.: US 11,106,221 B1
(45) Date of Patent: Aug. 31, 2021

(54) MULTICOPTER WITH SELF-ADJUSTING ROTORS

(71) Applicant: Kitty Hawk Corporation, Palo Alto, CA (US)

(72) Inventors: Sebastian Thrun, Los Altos Hills, CA (US); Benjamin Otto Berry, Mountain View, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 14 days.

(21) Appl. No.: 16/694,604

(22) Filed: Nov. 25, 2019

(51) Int. Cl.
| | |
|---|---|
| *B64C 27/52* | (2006.01) |
| *G05D 1/04* | (2006.01) |
| *B64C 29/00* | (2006.01) |
| *B64D 1/00* | (2006.01) |
| *B64C 27/20* | (2006.01) |
| *B64C 27/08* | (2006.01) |
| *B64C 27/48* | (2006.01) |
| *B64C 27/32* | (2006.01) |
| *B64F 1/02* | (2006.01) |

(52) U.S. Cl.
CPC ............. *G05D 1/046* (2013.01); *B64C 27/08* (2013.01); *B64C 27/20* (2013.01); *B64C 27/32* (2013.01); *B64C 27/48* (2013.01); *B64C 27/52* (2013.01); *B64C 29/0033* (2013.01); *B64D 1/00* (2013.01); *B64C 2201/104* (2013.01); *B64C 2201/108* (2013.01); *B64C 2201/162* (2013.01); *B64F 1/0295* (2020.01)

(58) Field of Classification Search
CPC .................................. G05D 1/046; B64C 27/52
See application file for complete search history.

(56) References Cited

U.S. PATENT DOCUMENTS

| | | | | |
|---|---|---|---|---|
| 2,983,319 | A * | 5/1961 | Kaman | B64C 27/54 416/115 |
| 4,582,013 | A * | 4/1986 | Holland, Jr. | B63H 9/02 114/39.3 |
| 4,730,795 | A * | 3/1988 | David | B64C 27/22 244/17.21 |
| 5,823,468 | A * | 10/1998 | Bothe | B64B 1/18 244/2 |

(Continued)

FOREIGN PATENT DOCUMENTS

| | | | | |
|---|---|---|---|---|
| CN | 1329555 | A * | 1/2002 | B64C 27/008 |
| CN | 101258071 | A * | 9/2008 | B64C 23/06 |

(Continued)

OTHER PUBLICATIONS eVTOL Configuration Comparison, Feb. 28, 2019.

*Primary Examiner* — Behrang Badii
*Assistant Examiner* — Jalal C Coduroglu
(74) *Attorney, Agent, or Firm* — Van Pelt, Yi & James LLP (57) ABSTRACT

In response to a change in a state of at least some part of a vehicle, a control signal associated with countering the change in the state while the vehicle is in an occupant change state is generated. The control signal is sent to a rotor in the vehicle while the vehicle is in the occupant change state, wherein the control signal causes the rotor to move in a manner that is counter to the change in the state and the rotor rotates about a substantially vertical axis of rotation and enables the vehicle to perform vertical takeoffs and landings.

21 Claims, 7 Drawing Sheets

(56) References Cited

U.S. PATENT DOCUMENTS

| | | | |
|---|---|---|---|
| 8,991,745 B1* | 3/2015 | Khan | B64C 27/02 244/17.13 |
| 9,022,314 B1* | 5/2015 | van der Westhuizen | B64C 27/18 244/17.25 |
| 9,169,009 B1* | 10/2015 | van der Westhuizen | B64C 27/18 |
| 9,764,829 B1* | 9/2017 | Beckman | B64C 15/14 |
| 10,308,358 B2 | 6/2019 | Phan | |
| 2002/0125368 A1* | 9/2002 | Phelps, III | B64C 27/52 244/17.23 |
| 2004/0007644 A1* | 1/2004 | Phelps, III | B64C 27/10 244/17.11 |
| 2004/0057830 A1* | 3/2004 | Boatner | F03D 3/067 416/61 |
| 2012/0207600 A1* | 8/2012 | Harris | F03D 3/02 416/1 |
| 2012/0298790 A1 | 11/2012 | Bitar | |
| 2013/0206921 A1 | 8/2013 | Paduano | |
| 2015/0068052 A1* | 3/2015 | Krueger | G01C 9/10 33/301 |
| 2015/0273179 A1* | 10/2015 | Krueger | G01C 9/12 600/27 |
| 2016/0159471 A1* | 6/2016 | Chan | B64C 27/08 244/39 |
| 2016/0311526 A1* | 10/2016 | Geise | B64C 27/14 |
| 2016/0311544 A1 | 10/2016 | Phan | |
| 2016/0340028 A1* | 11/2016 | Datta | B64C 15/12 |
| 2017/0015412 A1* | 1/2017 | Matus | G05D 1/0808 |
| 2017/0158320 A1* | 6/2017 | Bosch | B64C 27/52 |
| 2017/0190443 A1 | 7/2017 | Fisher | |
| 2017/0217581 A1* | 8/2017 | Hunter | B64C 27/006 |
| 2017/0284371 A1 | 10/2017 | Gamble | |
| 2017/0300051 A1 | 10/2017 | Zhou | |
| 2017/0371354 A1* | 12/2017 | Matus | B64C 27/08 |
| 2018/0079482 A1 | 3/2018 | Ivans | |
| 2018/0105267 A1* | 4/2018 | Tighe | B64D 29/02 |
| 2018/0150072 A1 | 5/2018 | Boss | |
| 2018/0194491 A1 | 7/2018 | Fisher | |
| 2018/0229833 A1* | 8/2018 | Kimchi | B64C 25/26 |
| 2018/0229837 A1* | 8/2018 | Kimchi | B64C 25/52 |
| 2018/0297695 A1* | 10/2018 | Ramirez-Serrano | B64C 27/08 |
| 2018/0339769 A1* | 11/2018 | McCullough | B64C 29/02 |
| 2018/0339771 A1* | 11/2018 | Oldroyd | B64C 11/46 |
| 2018/0339773 A1* | 11/2018 | McCullough | B64C 39/08 |
| 2018/0362188 A1 | 12/2018 | Achtelik | |
| 2019/0031331 A1* | 1/2019 | McCullough | B64D 27/26 |
| 2019/0031361 A1* | 1/2019 | McCullough | G05D 1/0077 |
| 2019/0108691 A1* | 4/2019 | Tucker | G05B 23/0232 |
| 2019/0186470 A1* | 6/2019 | Georgeson | F03D 80/50 |
| 2019/0291859 A1* | 9/2019 | Manning | B64C 39/026 |
| 2019/0308724 A1 | 10/2019 | Cooper | |
| 2020/0081432 A1* | 3/2020 | Szmuk | B64C 27/52 |
| 2020/0140079 A1* | 5/2020 | Campbell | B64C 39/024 |
| 2020/0207469 A1* | 7/2020 | Benedict | B64C 37/00 |
| 2020/0361601 A1* | 11/2020 | Mikic | B64C 3/385 |
| 2020/0377207 A1* | 12/2020 | Suzuki | B64D 45/02 |
| 2021/0001979 A1* | 1/2021 | Mikic | B64C 39/068 |
| 2021/0009279 A1* | 1/2021 | Hauer | F16H 1/222 |

FOREIGN PATENT DOCUMENTS

| | | | | |
|---|---|---|---|---|
| CN | 101314408 A | * | 12/2008 | |
| CN | 103003148 A | * | 3/2013 | B64C 27/22 |
| CN | 207972788 U | * | 10/2018 | B64C 27/10 |
| CN | 108860638 A | * | 11/2018 | B64C 27/008 |
| CN | 110816845 A | * | 2/2020 | B64C 27/52 |
| CN | 110879605 A | * | 3/2020 | B64C 27/006 |
| DE | 102004020282 A1 | * | 7/2006 | G01R 27/26 |
| EP | 0321336 A1 | * | 6/1989 | B64C 27/72 |
| EP | 1160156 A2 | * | 12/2001 | B64C 27/52 |
| KR | 20070042928 A | * | 4/2007 | B64D 39/04 |
| KR | 20110121546 A | * | 11/2011 | B64C 27/001 |
| KR | 20150058197 A | * | 5/2015 | G05D 1/0858 |
| WO | WO-9715492 A2 | * | 5/1997 | B64B 1/32 |
| WO | WO-03091099 A2 | * | 11/2003 | B64C 27/52 |
| WO | WO-2005086563 A2 | * | 9/2005 | B64C 27/52 |
| WO | WO-2011049843 A2 | * | 4/2011 | F03D 3/02 |
| WO | WO-2012107034 A1 | * | 8/2012 | B64C 15/00 |
| WO | WO-2016054018 A2 | * | 4/2016 | B64C 1/0009 |
| WO | WO-2018165057 A1 | * | 9/2018 | B64C 39/026 |

* cited by examiner

FIG. 7

MULTICOPTER WITH SELF-ADJUSTING ROTORS

BACKGROUND OF THE INVENTION

Traffic in many metropolitan areas (e.g., New York City, the San Francisco Bay Area, etc.) is getting worse. Deploying new mass transit routes (e.g., new subway or train lines, etc.) is typically very expensive and takes a very long time (e.g., on the order of decades). For this reason, using an aircraft as a more commonly available transportation option within a congested metropolitan area is becoming more attractive. It is less expensive and faster to deploy compared to mass transit options (e.g., trains, subways, etc.) and is not affected by congested roads and freeways. However, existing aircraft may need some improvements before they can be flown in a congested metropolitan area. For example, they may need to be relatively quiet which may require new vehicle geometries and/or arrangements. However, these new vehicle geometries and/or arrangements may introduce new issues which may need solutions. For example, aircraft that can quietly takeoff and land vertically may be relatively large in size and landing footprint. This would make the procurement of sufficient landing infrastructure a challenge in dense urban areas, which is where a VTOL aircraft service may be most beneficial to passengers.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using an aircraft, and in particular aircraft with vertical takeoff and landing (VTOL) capabilities, to get around congested metropolitan areas is an attractive solution to traffic congestion. In addition to avoiding congested streets, VTOL aircraft have a relatively small footprint. With a VTOL aircraft, it is not necessary to have a long runway to perform takeoffs and landing. A relatively small area is sufficient to take off and land, which is well suited to congested metropolitan areas. A VTOL aircraft can (for example) take off and land in parks, parking lots, rooftops, etc. This means that there are many potential takeoff and landing spots and the more takeoff and landing spots there are, the better coverage will be for people using the VTOL aircraft (e.g., their takeoff and landing spots near their point of origin and final destination).

One potential reason for resistance to the usage of such aircraft is noise. To address this, VTOL aircraft need to be quieter than they are now. A major source of noise is the rotors. The amount of noise from the rotors depends primarily upon the tip speed of the rotors. To reduce the tip speed (and thus reduce the amount of noise produced) while still being able to generate sufficient thrust to fly, one solution is to increase the diameters of the rotors (e.g., a diameter of 10 feet or more). Another solution is to increase the blade chord (width) and therefore total blade planform area, known as rotor blade solidity. These two solutions should not be considered mutually-exclusive.

However, a drawback to using longer rotor blades is that the larger diameter rotors may be more sensitive to wind, essentially acting like a sail. This is especially true when the vehicle is on the ground with the rotors stopped and/or if the vehicle is an (ultra)light vehicle (which enables the vehicle to fly longer for a given battery capacity). To address this, in some embodiments, the rotors keep spinning even when people are getting on and/or getting off the vehicle. Meanwhile, some process continually adjusts the forces and moments (primarily thrust forces) output by the rotors (e.g., so even if the wind shifts the state (e.g., position, rate, etc.) of the rotors relative to a previous state, the rotors return to the previous state (e.g., and the ground position of the passenger compartment is maintained). The following figure describes an example of this.

Figure 1:
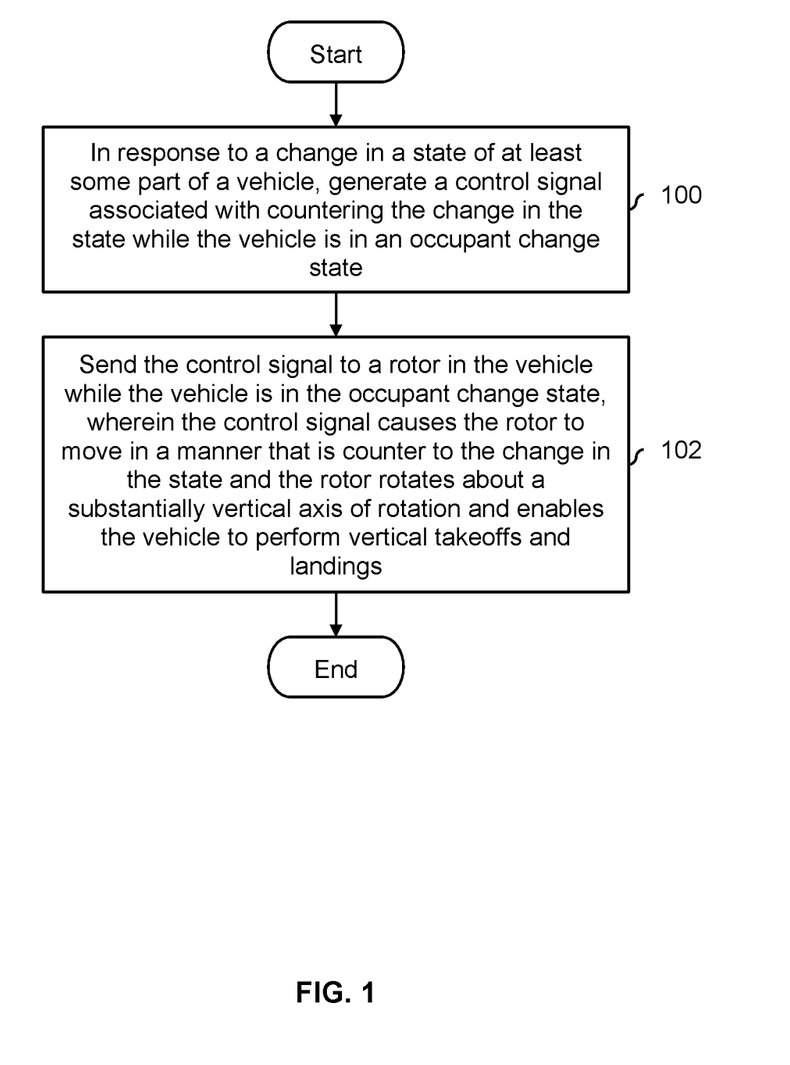
FIG. 1 is a flowchart illustrating an embodiment of an adjustment process associated with a vehicle.

FIG. 1 is a flowchart illustrating an embodiment of an adjustment process associated with a vehicle. In some embodiments, the process of FIG. 1 is used to keep a vehicle with long rotor blades from tipping over due to strong winds, eliminates the need for any infrastructure at the landing site to secure or otherwise tie down the vehicle, and/or returns the rotors to a previous state (e.g., a centered and/or level position or a previous rate after being tilted or otherwise displaced by the wind and/or due to noise or errors in the system).

At 100, in response to a change in a state (e.g., the position and/or rate) of at least some part of a vehicle, a control signal associated with countering the change in the state is generated while the vehicle is in an occupant change state. As used herein, the term "occupant change state" refers to a state, position, or mode where an occupant is permitted or otherwise able to get into or out of the vehicle. In some embodiments, one passenger gets off and another passenger gets on during the same occupant change state.

In one example, the vehicle performing the process of FIG. 1 is a VTOL quadcopter that touches down to drop off and/or pick up occupants (also referred to herein as passengers) and the large-diameter rotors sometimes catch in the wind and need to be adjusted or otherwise corrected for. The exemplary VTOL quadcopter may land to drop off and/or pick up an occupant. In this exemplary vehicle, the rotors are coupled to each other in a fixed manner (e.g., the vehicle is a quadcopter and the four rotors are mounted on two rigid crossbars) but the rotors may move separately from the fuselage. For example, a vertical beam which connects the rotor system and the fuselage may be flexible or otherwise bendable so that the rotors can move (due to the bending or flexing of the vertical beam) while the fuselage (e.g., which is on the ground) does not move. Using flexible vertical beams and/or cables and/or rods may be desirable in some applications because it permits better control of the vehicle while having a crew compartment or fuselage relatively far below the rotor system. Another way to describe it is to say that the passenger compartment is a kind of slung load.

In some embodiments, that portion of the vehicle is gimballed and/or the vertical beams and/or booms are rigid. For example, this simplifies takeoff and/or landing. In some such embodiments, the rotors just stabilize the lifting section but leave a fair bit of pressure on the rod(s), so that the crew compartment or fuselage doesn't move around in the wind.

In various embodiments, the movement and/or displacement of the rotors (which in this example are the primary part of the vehicle that moves when on the ground to drop off and/or pick up occupants) can be detected using a variety of sensors (e.g., accelerometers, gyroscopes, LIDAR or radar-based techniques, etc.). In one example of step 100, based on the detected or otherwise measured change in the positions or rates of the rotor(s), a control signal (e.g., which causes the rotors to rotate faster or slower, and/or change blade pitch angle, etc.) is generated which attempts to return the rotor(s) to an original, desired, centered, and/or level state (e.g., position) using the specified or resulting forces and moments (primarily thrust force) from the control signal.

At 102, the control signal is sent to a rotor in the vehicle while the vehicle is in the occupant change state, wherein the control signal causes the rotor to move in a manner that is counter to the change in the state (e.g., position and/or rate) and the rotor rotates about a substantially vertical axis of rotation and enables the vehicle to perform vertical takeoffs and landings. For example, if the vehicle is a quadcopter in a diamond formation where the front and back rotors are still level but the right rotor has tilted down and the left rotor has tilted up, the right rotor may be instructed to output more thrust and the left rotor may be instructed to output less thrust, and the front and back rotors are kept at a same amount of thrust.

Figure 2:
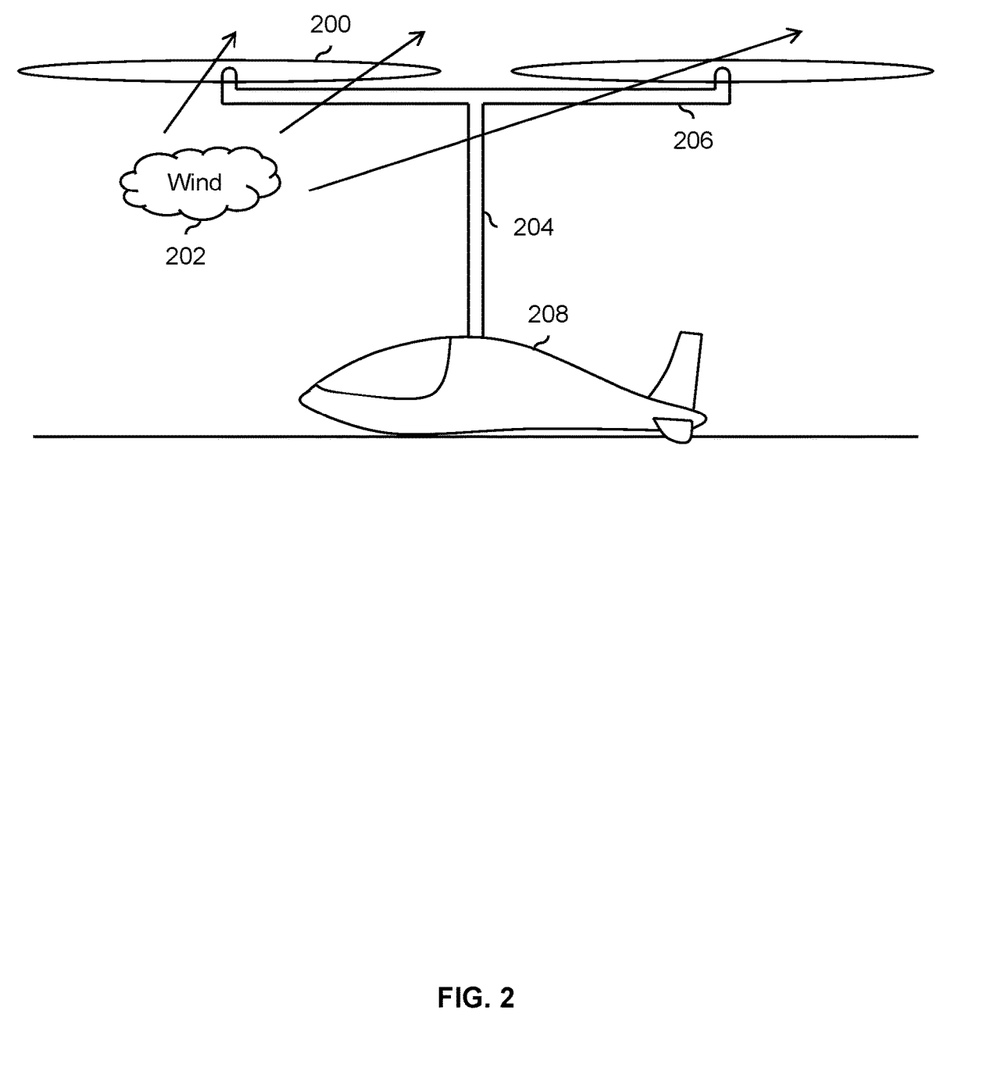
FIG. 2 is a diagram illustrating an embodiment of a vehicle which performs an adjustment process when on the ground.

The following figure shows an embodiment of a vehicle which may perform the process of FIG. 1. Naturally, this vehicle is merely exemplary and is not intended to be limiting.

FIG. 2 is a diagram illustrating an embodiment of a vehicle which performs an adjustment process when on the ground. In this example, the vehicle lands in order to let people off and on (i.e., the occupant change state occurs while the vehicle is on the ground). In this example, the vehicle is a quadcopter with four rotors (200) which rotate about a vertical axis of rotation. This permits the vehicle to perform vertical takeoffs and landings (VTOL). This VTOL capability may be desirable because it permits the multicopter to land in tighter location places and/or without a runway (e.g., in a city). To reduce the noise produced by the multicopter, the diameter of the rotors is relatively large.

In this example, the multicopter is on the ground when the vehicle is in the occupant change state. In one example of how FIG. 1 is used, suppose that the wind (202) blows and moves the state (e.g., position) of one or more rotors in the multicopter. A controller (e.g., a flight and/or avionics controller) generates one or more control signals (e.g., one for each rotor) to counter the change in the state of the rotor due to the wind. In some embodiments, the shifting that is corrected or otherwise adjusted for is due to noise or errors (e.g., sensor noise, inaccurate models, etc.). To put it another way, the controller generates one or more control signals which will cause the rotors to rotate and/or thrust in a manner which causes them to return to a desired, centered, and/or level position. In this example, there are four rotors so four control signals would be generated, one for each rotor in the vehicle.

A vertical beam (204) is used to elevate the rotors above the heads of any people in the vicinity of the aircraft. For example, the vertical beam (204) may be tall enough so that the rotors (200) are above the passenger, and in some embodiments above other common ground obstacles. This may be desirable because it further reduces noise and it is safer for people in the vicinity of the vehicle (e.g., the rotors are too high to hit anyone walking by). As described above, in some embodiments, the vertical beam (204) is bendable or flexible so that the rotors (200) which are connected to rigid crossbars (206) can move separately from the fuselage (208).

In some embodiments, a vehicle includes one or more joints so that one part of the vehicle can move at least partially independently of another part of the vehicle. For example, there may be a joint where the vertical beam (204) meets the crossbars (206). This may, for example, permit the fuselage (and occupants therein) to move independently of the rotors. This may, for example, provide a more pleasant flight experience for the occupant of the aircraft.

The fuselage shape (208) shown here is merely exemplary and is not intended to be limiting. In some embodiments, the vehicle is a battery powered, autonomously flown vehicle which is used to fly riders from specified pickup locations to specified drop off locations. To improve flight time (and thus, the time between charging), the fuselage may be very different than the example shown here. In some embodiments, the fuselage is an "open air" and/or unenclosed fuselage. For example, there may be a (single) seat for the occupant with safety restraints (e.g., seat belts, a bar which comes down over the occupant's head). Such a "stripped down" fuselage may more closely resemble a ski lift chair or a seat in an amusement park ride rather than a heavier fuselage that completely encloses the occupant. In some other embodiments, the fuselage is enclosed. For example, this may be desirable in applications where the passengers would prefer the comfort and/or protection offered by an enclosed fuselage.

Figure 3A:
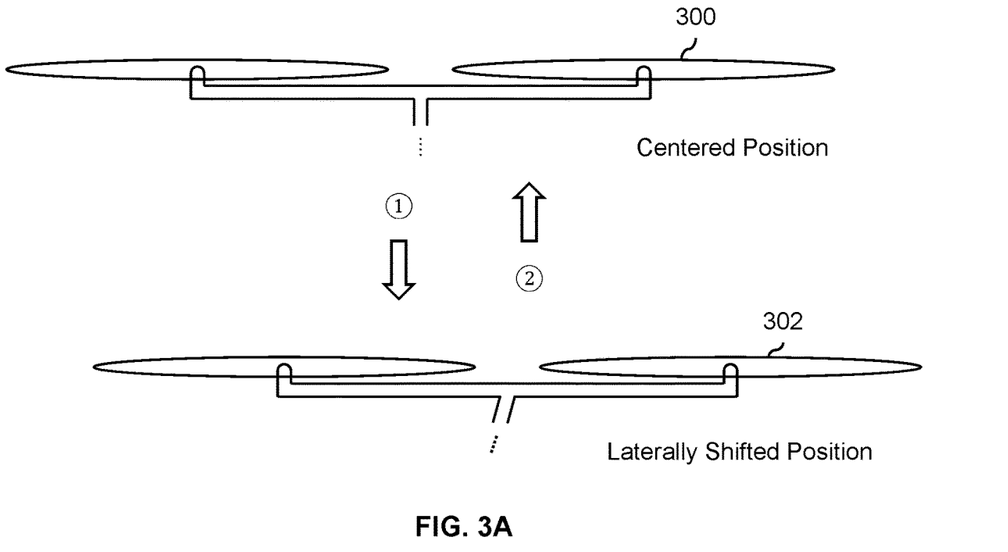
FIG. 3A is a diagram illustrating an embodiment of a lateral change in the state of the rotor.

The following figure shows some example changes in the state of the rotors which may be adjusted or otherwise corrected for (e.g., while the exemplary vehicle shown here is on the ground so that occupants can get on and/or off) using the process of FIG. 1.

FIG. 3A is a diagram illustrating an embodiment of a lateral change in the state of the rotor. This figure continues the example of FIG. 2, but only the rotors are shown. In this example, rotors 300 are in a centered position. The rotors then shift laterally (i.e., sideways) as shown by laterally shifted rotors 302. For example, this change in position from centered rotors 300 to laterally shifted rotors 302 may be due to wind, noise or errors in the flight or avionics system, etc.

In response to this change in position (e.g., from 300 to 302), control signals (in this example, four or more control signals, one or more for each rotor) are generated for and sent to the rotors. The rotors would then execute their respective control signal, which would cause the rotors to rotate and/or generate thrust in a manner which would cause the rotors to return to the original, centered position (300).

Figure 3B:
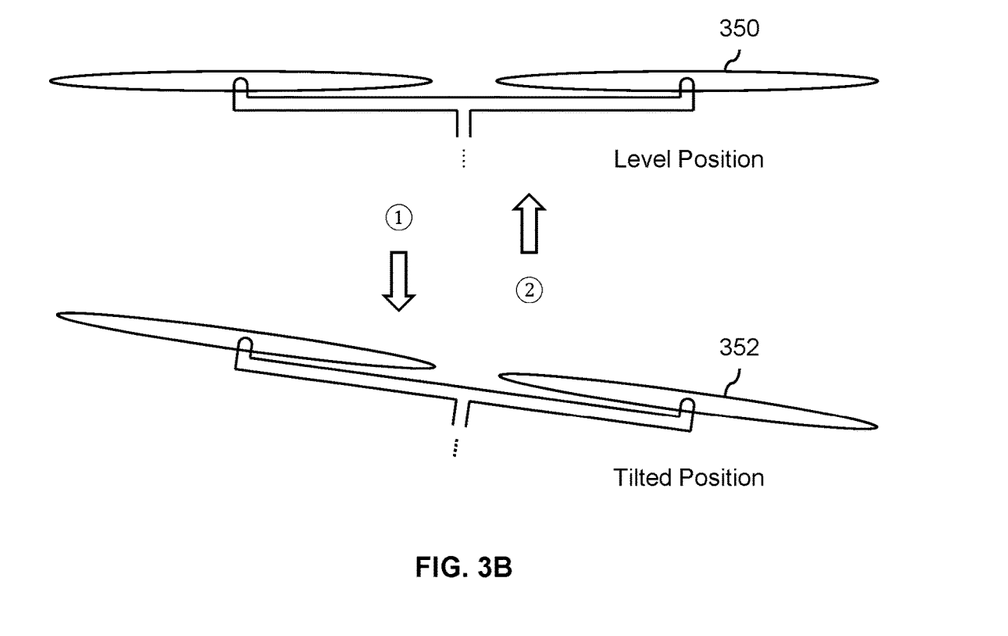
FIG. 3B is a diagram illustrating an embodiment of an angular change in the position of the rotor.

FIG. 3B is a diagram illustrating an embodiment of an angular change in the position of the rotor. In this example, rotors 350 are in a level position (e.g., where the roll, pitch, and yaw angles of the rotors are at 0 degrees). As before, wind, noise in the system, and or errors cause one side of the rotors to tilt up and the other side of the rotors to tilt down, putting the rotors into a tilted position. See tilted rotors 352.

The process of FIG. 1 may be used to correct or otherwise self-adjust for this. Control signals would be generated for the exemplary four rotors which would cause the rotors to return to the original, centered position (see 350).

One benefit of the self-correcting or self-adjusting techniques described herein is that it eliminates the need for docking or tethering infrastructure at takeoff and landing locations. In one example application, a VTOL vehicle (see, e.g., FIG. 2) is part of a fleet of vehicles in a transportation network and/or ride service in a crowded metropolitan area. The VTOL vehicles pick up and drop off people at approved locations within a city or metropolitan area (e.g., on the roof of a building, in a park, in a parking lot, etc.). The techniques described herein permit quieter vehicles to be used while still supporting a robust collection of pickup and drop off locations (e.g., which are not constrained by the need for docking or tethering infrastructure). For example, if the vehicles needed docking or tethering infrastructure at takeoff and landing locations, this would add considerably to the cost and/or time to deploy such a transportation system. As a practical matter, it would probably also reduce the number of pickup and drop off locations (e.g., due to cost).

In some embodiments, the vehicle has high-friction landing gear. For example, the passenger compartment lands and has a high-friction landing gear that resists sliding or movement of the compartment if the rotor do not counter all of the wind disturbances.

Figure 4:
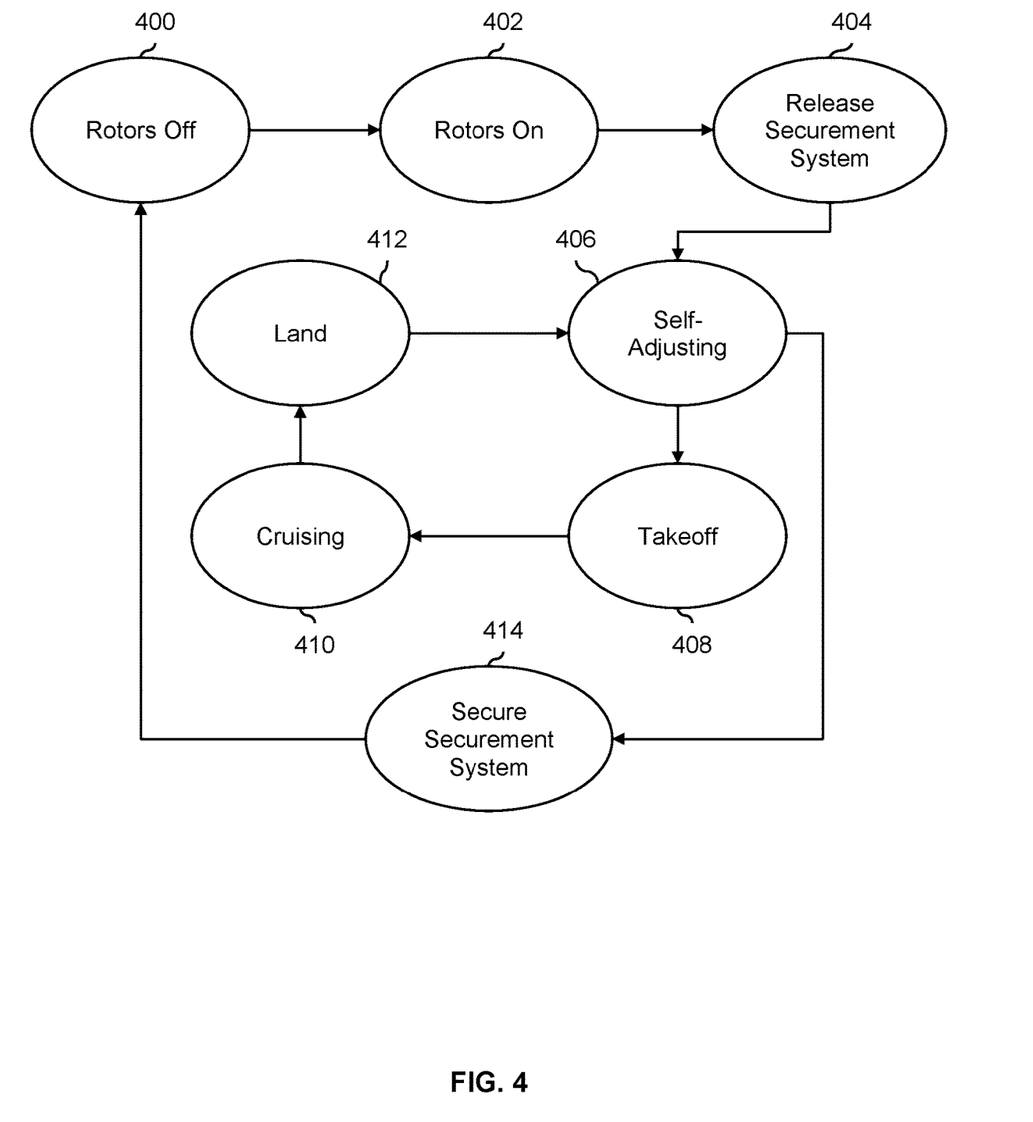
FIG. 4 is a diagram illustrating an embodiment of a state machine associated with a VTOL vehicle.

It may be helpful to illustrate an example of how a vehicle operates over the course of a day to help illustrate where the self-adjusting techniques described herein may be used. The following figure describes one such example.

FIG. 4 is a diagram illustrating an embodiment of a state machine associated with a VTOL vehicle. In this example, the exemplary vehicle is used in a ride service, picking up and dropping off passengers throughout the day. For example, riders may request pickups and some central server or controller instructs vehicles to go to a certain location, pick up a person there, and then drop them off at some other location. In this example, the vehicle is a single-seat, autonomously flown vehicle to keep weight down and increase the time between charges (i.e., flight time).

In this example, the vehicle begins the day with its rotors off (400), for example at some depot or maintenance yard. In this example, while it is in this state (400), the vehicle and/or its rotors are secured using some securement system (e.g., ties, bungees, clamp, etc. that secures or otherwise ties down some or all of the vehicle) so that large-diameter rotors do not catch in the wind and/or the vehicle does not blow over. For example, while it may be undesirable to have such a securement system at every drop off and pickup location, it may be acceptable to have a securement system at a depot or maintenance yard.

When it is time for the first flight of the day, the rotors are turned on (e.g., while the vehicle is still secured, at least in this example) and the vehicle enters rotors on state (402). In some embodiments, a hovering or self-adjusting process (see, e.g., FIG. 1) is started in the rotors on state (402) so that the rotors are ready to adjust themselves and/or the rest of the vehicle (e.g., if blown by the wind) once the support is released.

The vehicle then enters the release securement system (404). For example, the ties, bungees, clamps or other securement comprising the securement system is released. The vehicle then enters the self-adjusting state (406), for example where the process of FIG. 1 is used to compensate or otherwise adjust for the large-diameter rotors acting like sails in the wind. In this example, at least, the vehicle is still on the ground up to and including state 406. Other drifting or movement (e.g., while hovering, for example due to noise or errors in the system) may also be corrected for in state 406.

The vehicle then (e.g., when so permitted by the pilot-passenger or by an autonomous flight process) enters takeoff state (408) where it takes off by ascending vertically. In some embodiments, the process of FIG. 1 is not necessarily performed in this state (e.g., because an autonomous takeoff process will ensure that the vehicle is not blown about from side-to-side and/or tilts to an excessive and/or uncomfortable degree). For simplicity and ease of explanation, it is assumed that the depot is not a pickup or drop off location, so during this first takeoff of the day, the vehicle is unoccupied.

Once the vehicle ascends vertically to a desired cruising altitude, the vehicle enters a cruising state (410) where in this example the vehicle flies at a constant altitude towards a pre-specified and/or pre-determined location. For example, the occupant of the vehicle may be specified a final destination ahead of time (i.e., before getting on board) and the closest landing location may have been selected.

When the vehicle is over the landing zone, the vehicle switches to land state (412) where the vehicle descends vertically and touches down on the ground. As described above, the vehicle may land on the roof of a building, in a park, in a parking lot, etc.

Once the vehicle touches down (at least in this example), the vehicle enters the self-adjusting state (406). During this second time through the self-adjusting state, a passenger boards the vehicle. The vehicle continues to cycle through states 408, 410, 412, and 406 until it is done for the day (e.g., it needs to recharge). After dropping off the last passenger and heading to the depot, the vehicle will land (state 412), run the self-adjusting process (state 406), and then have the securement system secured (414). Once secured, the rotors are turned off (state 400) and the vehicle can be charged (in this example the vehicle is battery powered).

It is noted that the techniques described herein are applicable to a variety of vehicles, usage scenarios, and/or applications. In the example described above, the vehicle is an autonomous vehicle (e.g., where the person in the vehicle is merely a passenger, specifies their destination ahead of time, and the vehicle autonomously plots and executes a flight path to that specified destination). It is noted that the techniques described herein would also work in non-autonomous applications where the vehicle is piloted by a person inside the vehicle.

Similarly, the techniques described herein are applicable in an owner-operated paradigm (e.g., where a person owns their vehicle and is the primary user of the vehicle) as well as a ride share paradigm (e.g., a company owns a fleet of vehicles that service many passengers, many individual owners of vehicles voluntarily ferry around passengers, etc.). FIG. 4 and other examples are merely exemplary and are not intended to be limiting.

Figure 5:
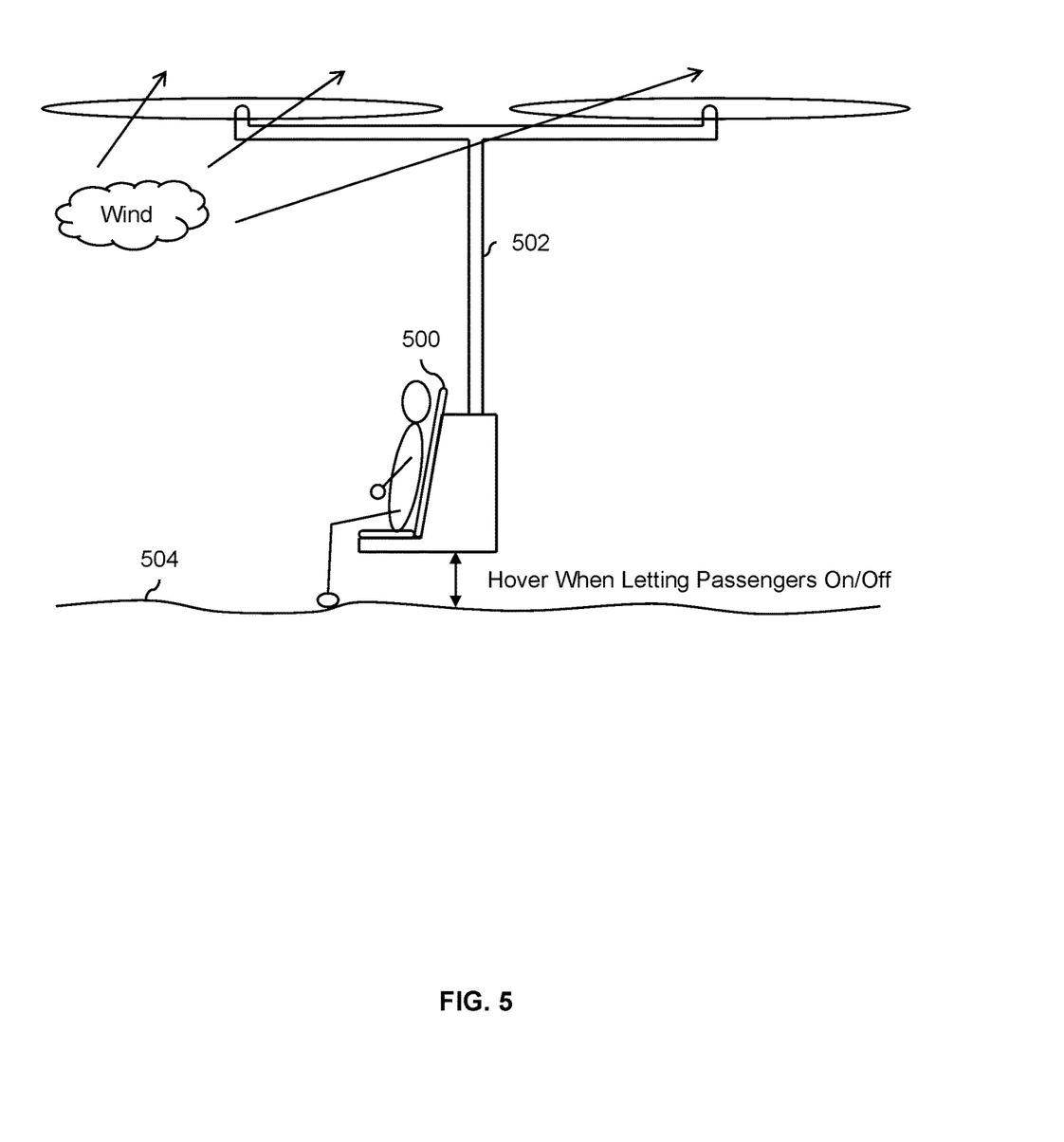
FIG. 5 is a diagram illustrating an embodiment of a vehicle that hovers in the air during the occupant change state.

Returning briefly to FIG. 1, in some embodiments, the vehicle never touches down during the occupant change state. The following figure shows one exemplary vehicle which does not land when letting an occupant off and/or on.

FIG. 5 is a diagram illustrating an embodiment of a vehicle that hovers in the air during the occupant change state. In this example, the vehicle is a VTOL, single seat, and autonomously flown vehicle. For example, passengers request a ride and specify a pickup location and drop off location. After the request is granted, a vehicle (e.g., selected from a fleet of vehicles) is sent to pick up the person and take them to the requested destination. To reduce noise (and correspondingly reduce resistance to the service from nearby residents and businesses and/or to comply with local noise ordinances), the blades of the rotors are relatively long.

In the context of FIG. 1, the exemplary vehicle shown in FIG. 5 has an occupant change state where the vehicle does not touch down or otherwise land on the ground in order to let occupants on and/or off. Rather, the vehicle hovers above the ground, low enough so that the passenger can get into or out of the vehicle. Similar to the vehicle shown in FIG. 2, the vertical spar (502) is relatively tall (e.g., sufficiently tall so that the rotors are a height of at least 15 or 20 feet) so that the rotors can remain on (e.g., so that the vehicle can hover in place during the disembarkment state, including any adjustment in response to the wind) while passengers enter and exit the vehicle.

In some embodiments, the vehicle includes some display (e.g., screen) or other visual indicator that signals to a person when it is safe or permitted for that person to enter and/or exit the vehicle (i.e., when the vehicle is in the occupant change state). For example, there may be some light that is off when it is not safe to enter the vehicle (e.g., the vehicle is still moving) and turns on when the passenger is permitted to exit and/or enter the vehicle (e.g., the vehicle has stopped and is hovering in place).

In various embodiments, a variety of techniques are used to detect when a passenger has gotten off the vehicle and the vehicle can take off again (e.g., for those situations when no new passenger is getting on board). In some embodiments, the vehicle detects the change in weight (e.g., by a decrease in the amount of thrust and/or power and/or torque that the rotors must output to remain airborne, or a load cell between the rotor system and the passenger compartment). In some embodiments, the vehicle detects the change in pressure on the passenger seat. In some embodiments, the vehicle detects the presence of a passenger using an optical camera and recognition algorithms. In some embodiments, the vehicle detects the presence of a passenger using infrared sensors, which will detect body heat. In some embodiments, an app loaded onto a smart phone is used to signal or detect that the passenger has deplaned. For example, using the app, it may be detected when the phone moves away from the vehicle, indicating that the occupant has deplaned. Alternatively, the occupant may signal, via the app, that they have deplaned.

To make entering and exiting easier for passengers, in this example, the fuselage includes a seat or chair (500) with no sidewalls. The seat may include a restraint (not shown) to hold the passenger in place, such as a seat belt harness or a bar that comes down over the passenger's head. For example, the seat (500) and an associated restraint may resemble a ski lift chair or an amusement park ride. A variety of fuselages, seats, and/or safety features may be employed by the vehicle and the example shown here is merely illustrative and is not intended to be limiting.

Returning to FIG. 1, in some embodiments, a (e.g., pre-existing) process or control loop associated with hovering mid-air is used to generate the control signal at step 100. For example, because the exemplary vehicle shown in FIG. 5 is a VTOL aircraft, it is capable of hovering mid-air in the same position or state (e.g., unlike a conventional takeoff and landing vehicle which must always be moving forwards to achieve the necessary aerodynamic lift on the wing to keep a conventional takeoff and landing vehicle airborne). As such, the VTOL aircraft already has a hovering process and that pre-existing hovering process or control loop is used at step 100 to keep the VTOL aircraft steady as occupants get off and/or get on the vehicle.

Returning to FIG. 5, one benefit of not landing during the occupant change state is that it is not necessary for the landing zone to be level. As shown here, a pickup or drop off can be performed even if the ground (504) is not level. Hovering may also reduce wear and tear on the bottom of the vehicle since the bottom of the vehicle does not come into contact with the ground when occupants are dropped off and/or picked up. Another benefit is that it may be easier and/or simpler to keep a vehicle with large-diameter rotors steady while airborne as opposed to being on the ground.

In various embodiments, the height at which the exemplary multicopter stops and lets passengers off and on may be set or otherwise detected in a variety of ways. In one example, the vehicle includes ground and/or altitude sensors. As the vehicle descends, these sensors will measure or otherwise estimate the distance to the ground (i.e., the vehicle's altitude). When the vehicle reaches some pre-defined distance to the ground, the vehicle will stop and hover mid-air at the height. The occupant would then be permitted to disembark and/or a new occupant would get on while the vehicle hovers in the air.

In some embodiments, a passenger getting off or on has some control over the height of the vehicle as it hovers. In one example, the vehicle stops automatically at a predefined distance to the ground. In some embodiments, the vehicle has some control or switch (e.g., an up-down thumbwheel, an up button and a down button, etc.) which permits a passenger (e.g., who is about to get into the vehicle) to adjust the height of the vehicle as it hovers. For example, shorter passengers or those with mobility issues may want the vehicle to be lower before getting on. In some embodiments, the vehicle can be remotely controlled (e.g., using an app loaded onto a smartphone). For example, this may be desirable because the occupant can remain at a distance from the moving vehicle while the vehicle adjusts its height.

Similarly, the height of the vehicle at which it hovers when passengers get off may be adjustable by a passenger already on the vehicle.

In some embodiments, at the beginning and/or end of the day, the exemplary vehicle shown in FIG. 5 returns to some depot or maintenance yard and where the vehicle lands, is secured using a securement system (e.g., so that the rotors can stop), and/or is charged. See, for example, FIG. 4. Alternatively, a vehicle (e.g., the vehicle shown in FIG. 2, the vehicle shown in FIG. 5, or some other embodiment) may be configured so that it does not need to be secured when the rotors are off. The following figure shows one example of this.

Figure 6:
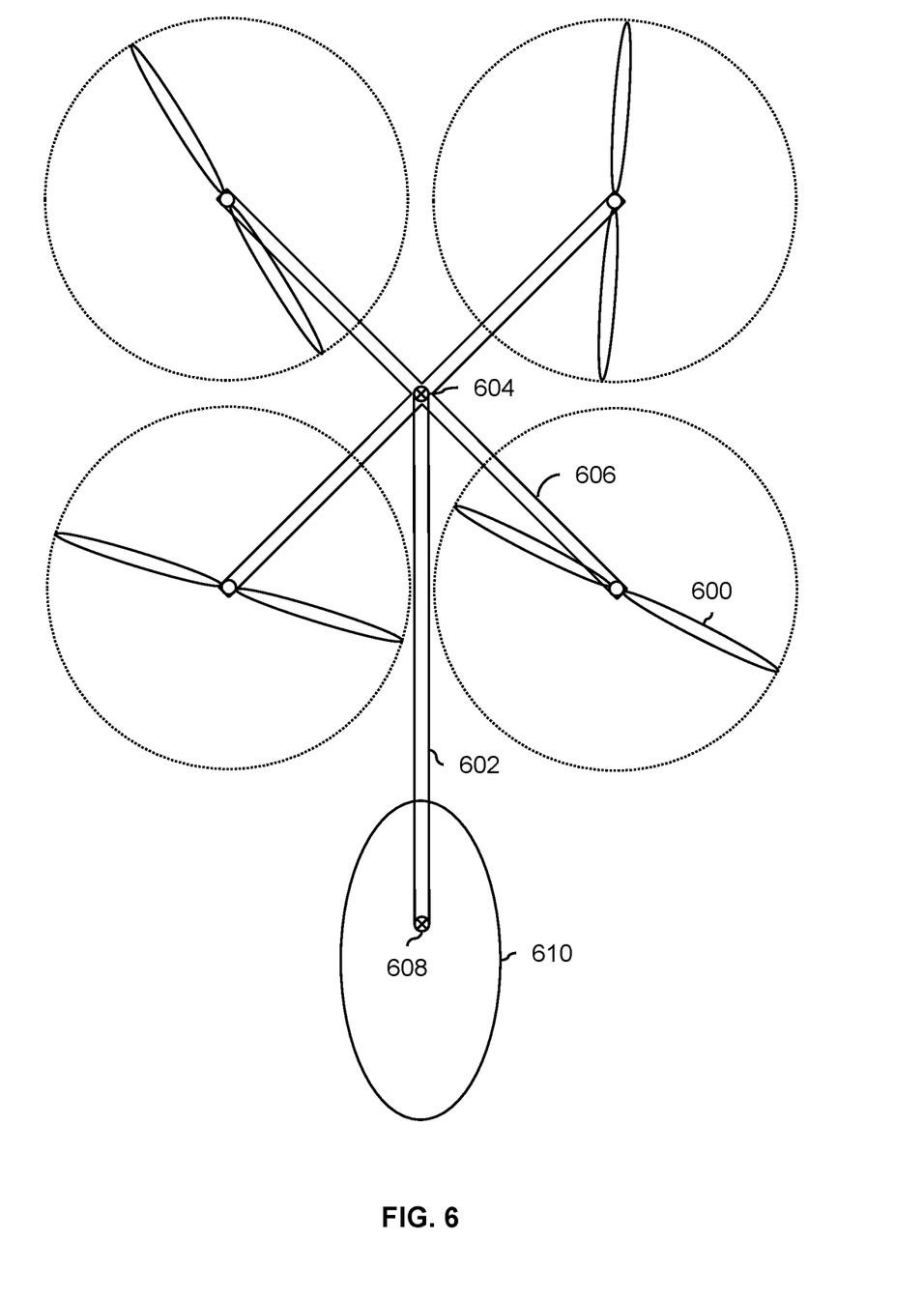
FIG. 6 is a diagram illustrating an embodiment of a vehicle with a foldable vertical beam, from a top-down view.

FIG. 6 is a diagram illustrating an embodiment of a vehicle with a foldable vertical beam, from a top-down view. In this example, to prevent the long-bladed rotors (600) from catching in the wind (e.g., when the rotors are off and/or the vehicle is being charged), the vertical beam (602) is foldable so that the rotors can rest on the ground when they are off. When so positioned (i.e., on the ground), the rotors are much less likely to catch in the wind and it is not necessary to have a securement system to tie the vehicle down. For example, this may be desirable if the vehicle is going to land and stay for some time in an undeveloped area. The vehicle can land without requiring a securement system or other infrastructure.

In this example, the vertical beam is foldable because it has two hinges or joints: an upper hinge (604) where the center of the horizontal crossbars (606) meets the vertical beam (602) and a lower hinge (608) where the vertical beam (602) meets the fuselage (610). As shown here, the vertical beam (602) is sufficiently tall so that when folded, none of the rotors (600) will hit or otherwise overlap with the fuselage. In one example of how the vertical beam is folded, the vehicle touches down so that the fuselage (610) is on the ground while the rotors (600) remain on. The hinges (604 and 608), if lockable, are then released. The rotors (600) then descend downwards and sideways to the ground next to the fuselage (610), shifting the vertical beam from a vertical position to a horizontal position as the rotors descend. Once the rotors touch down, they are turned off.

It is noted that this foldable vertical beam embodiment may be used in combination with any other features and/or exemplary vehicles (e.g., with FIG. 2 and/or FIG. 5) described above. To put it another way, in some embodiments, a foldable vertical beam is used in vehicles that land to drop off and pick up occupants. In some embodiments, a foldable vertical beam is used in vehicles that hover in air while dropping off and picking up passengers.

Figure 7:
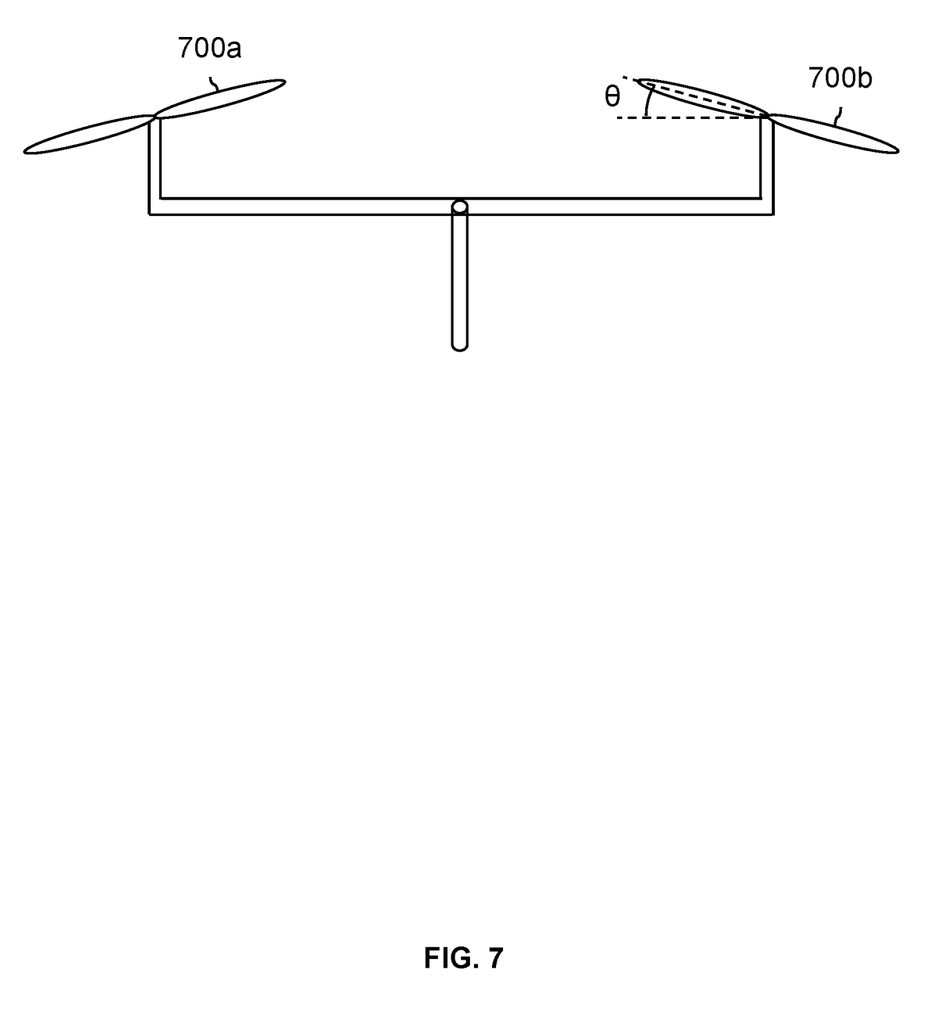
FIG. 7 is a diagram illustrating an embodiment of canted rotors.

FIG. 7 is a diagram illustrating an embodiment of canted rotors. In this example, the rotors (700a and 700b) are canted at a non-zero angle of θ relative to a horizontal plane. For example, θ may be in the range of 5°-20°, inclusive. In some applications, canted rotors are desirable because such rotors can provide direct sideward forces without needing to tilt the entire rotor system first. This enables a faster response time to reject sideward wind gusts or disturbances and therefore may be desirable (as an example) in applications or environments which are more susceptible to such wind gusts or disturbances). It is noted that although only two rotors are shown here, in a real-world application, a minimum of six rotors may be required.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A vehicle, comprising:
a flight controller, wherein:
in response to a change in a state of at least some part of the vehicle, including a rotor in the vehicle moving from a previous position while the vehicle is in an occupant change state, the flight controller generates a control signal associated with countering the change in the state while the vehicle is in the occupant change state; and
the flight controller sends the control signal to the rotor in the vehicle while the vehicle is in the occupant change state; and
the rotor, wherein:
the control signal causes the rotor to move in a manner that is counter to the change in the state, including by returning to the previous position while the vehicle is in the occupant change state;
the rotor rotates about a substantially vertical axis of rotation and enables the vehicle to perform vertical takeoffs and landings; and
the rotor rotates throughout the occupant change state.

2. The vehicle of claim 1, wherein the rotor has a blade with a diameter that is greater than or equal to 10 feet.

3. The vehicle of claim 1, wherein the rotor is at a height that is greater than or equal to 10 feet.

4. The vehicle of claim 1, wherein the vehicle is in the occupant change state while on the ground.

5. The vehicle of claim 1, wherein:
the vehicle further includes a vertical beam attached at a first end to a fuselage and attached at a second end to a horizontal crossbar to which the rotor is attached; and
the vertical beam is flexible.

6. The vehicle of claim 1, wherein the vehicle is a battery powered, single seat, and autonomously flown vehicle.

7. The vehicle of claim 1, wherein:
the vehicle is in the occupant change state while hovering in the air; and
the vehicle further includes a visual indicator that indicates when the vehicle is in the occupant change state.

8. The vehicle of claim 1, wherein:
the vehicle is in the occupant change state while hovering in the air; and
a height at which the vehicle hovers in the air during the occupant change state is adjustable by an occupant prior to entering.

9. The vehicle of claim 1, wherein:
the vehicle further includes a vertical beam attached at a first end to a fuselage and attached at a second end to a horizontal crossbar to which the rotor is attached; and
the vertical beam is foldable.

10. The vehicle of claim 1, wherein the rotor includes a canted rotor with an angle within a range of 5°-20°, inclusive.

11. A method, comprising:
in response to a change in a state of at least some part of a vehicle, including a rotor in the vehicle moving from a previous position while the vehicle is in an occupant change state, generating a control signal associated with countering the change in the state while the vehicle is in the occupant change state; and
sending the control signal to the rotor in the vehicle while the vehicle is in the occupant change state, wherein:

the control signal causes the rotor to move in a manner that is counter to the change in the state, including by returning to the previous position while the vehicle is in the occupant change state;

the rotor rotates about a substantially vertical axis of rotation and enables the vehicle to perform vertical takeoffs and landings; and the rotor rotates throughout the occupant change state.

12. The method of claim 11, wherein the rotor has a blade with a diameter that is greater than or equal to 10 feet.

13. The method of claim 11, wherein the rotor is at a height that is greater than or equal to 10 feet.

14. The method of claim 11, wherein the vehicle is in the occupant change state while on the ground.

15. The method of claim 11, wherein:
the vehicle further includes a vertical beam attached at a first end to a fuselage and attached at a second end to a horizontal crossbar to which the rotor is attached; and
the vertical beam is flexible.

16. The method of claim 11, wherein the vehicle is a battery powered, single seat, and autonomously flown vehicle.

17. The method of claim 11, wherein:
the vehicle is in the occupant change state while hovering in the air; and
the vehicle further includes a visual indicator that indicates when the vehicle is in the occupant change state.

18. The method of claim 11, wherein:
the vehicle is in the occupant change state while hovering in the air; and
a height at which the vehicle hovers in the air during the occupant change state is adjustable by an occupant prior to entering.

19. The method of claim 11, wherein:
the vehicle further includes a vertical beam attached at a first end to a fuselage and attached at a second end to a horizontal crossbar to which the rotor is attached; and
the vertical beam is foldable.

20. The method of claim 11, wherein the rotor includes a canted rotor with an angle within a range of 5°-20°, inclusive.

21. A computer program product, the computer program product being embodied in a non-transitory computer readable storage medium and comprising computer instructions for:

in response to a change in a state of at least some part of a vehicle, including a rotor in the vehicle moving from a previous position while the vehicle is in an occupant change state, generating a control signal associated with countering the change in the state while the vehicle is in the occupant change state; and sending the control signal to the rotor in the vehicle while the vehicle is in the occupant change state, wherein:
the control signal causes the rotor to move in a manner that is counter to the change in the state, including by returning to the previous position while the vehicle is in the occupant change state;
the rotor rotates about a substantially vertical axis of rotation and enables the vehicle to perform vertical takeoffs and landings; and
the rotor rotates throughout the occupant change state.

* * * * *

UNITED STATES PATENT AND TRADEMARK OFFICE
CERTIFICATE OF CORRECTION

PATENT NO. : 11,106,221 B1
APPLICATION NO. : 16/694604
DATED : August 31, 2021
INVENTOR(S) : Thrun et al.

It is certified that error appears in the above-identified patent and that said Letters Patent is hereby corrected as shown below:

In the Specification

In Column 9, Line(s) 55, delete "0" and insert --O--, therefor.

In the Claims

In Column 10, Line(s) 9, Claim 1, after "part of", delete "the" and insert --a--, therefor.

Signed and Sealed this
Twenty-sixth Day of April, 2022

Katherine Kelly Vidal
*Director of the United States Patent and Trademark Office*